(12) United States Patent
Eccleston

(10) Patent No.: US 7,204,524 B2
(45) Date of Patent: Apr. 17, 2007

(54) FLEXIBLE PIPE/END FITTING ASSEMBLY AND METHOD

(75) Inventor: Tony Eccleston, High Heaton (GB)

(73) Assignee: Wellstream International Limited, Newcastle Upon Tyne (GB)

(*) Notice: Subject to any disclaimer, the term of this patent is extended or adjusted under 35 U.S.C. 154(b) by 137 days.

(21) Appl. No.: 10/808,631

(22) Filed: Mar. 24, 2004

(65) Prior Publication Data
US 2004/0245774 A1 Dec. 9, 2004

Related U.S. Application Data

(60) Provisional application No. 60/457,653, filed on Mar. 26, 2003.

(51) Int. Cl.
*F16L 33/00* (2006.01)
(52) U.S. Cl. .................. 285/258; 285/222.4; 285/404
(58) Field of Classification Search ............ 285/222.1, 285/222.2, 222.3, 222.4, 258, 404
See application file for complete search history.

(56) References Cited

U.S. PATENT DOCUMENTS

| | | | | |
|---|---|---|---|---|
| 735,735 A | * | 8/1903 | Feust et al. ............ | 285/55 |
| 1,365,306 A | * | 1/1921 | Dickinson ............ | 285/222.2 |
| 1,915,041 A | * | 6/1933 | Wallace ............... | 285/258 |
| 2,228,018 A | * | 1/1941 | Scholtes ............ | 285/222.4 |
| 2,920,910 A | * | 1/1960 | Schnabel ............ | 285/222.4 |
| 3,325,194 A | | 6/1967 | Grawey | |
| 4,486,036 A | * | 12/1984 | Storke et al. ........ | 285/253 |
| 4,666,191 A | * | 5/1987 | Sotelo et al. ........ | 285/222.2 |
| 5,010,952 A | | 4/1991 | Chin et al. | |
| 5,255,944 A | * | 10/1993 | Blin et al. ............ | 285/222.2 |
| 6,405,762 B1 | | 6/2002 | Bunch | |
| 6,938,932 B2 | * | 9/2005 | Grepaly et al. ....... | 285/222.2 |
| 2002/0144745 A1 | | 10/2002 | Fraser et al. | |

FOREIGN PATENT DOCUMENTS

| | | |
|---|---|---|
| DE | 11 64 172 | 2/1964 |
| FR | 1 325 153 | 3/1963 |
| FR | 2 590 647 | 5/1987 |
| GB | 2 302 383 | 1/1997 |

\* cited by examiner

*Primary Examiner*—David Bochna
(74) *Attorney, Agent, or Firm*—Klarquist Sparkman, LLP

(57) ABSTRACT

An end fitting, a pipe assembly and a method of assembling a pipe assembly according to which an end fitting is provided with a bore and at least one raised portion is provided on the surface of the housing of the end fitting defining the bore. When an end portion of a pipe is inserted in the bore the raised portion engages the corresponding outer surface of the pipe to provide a seal.

36 Claims, 2 Drawing Sheets

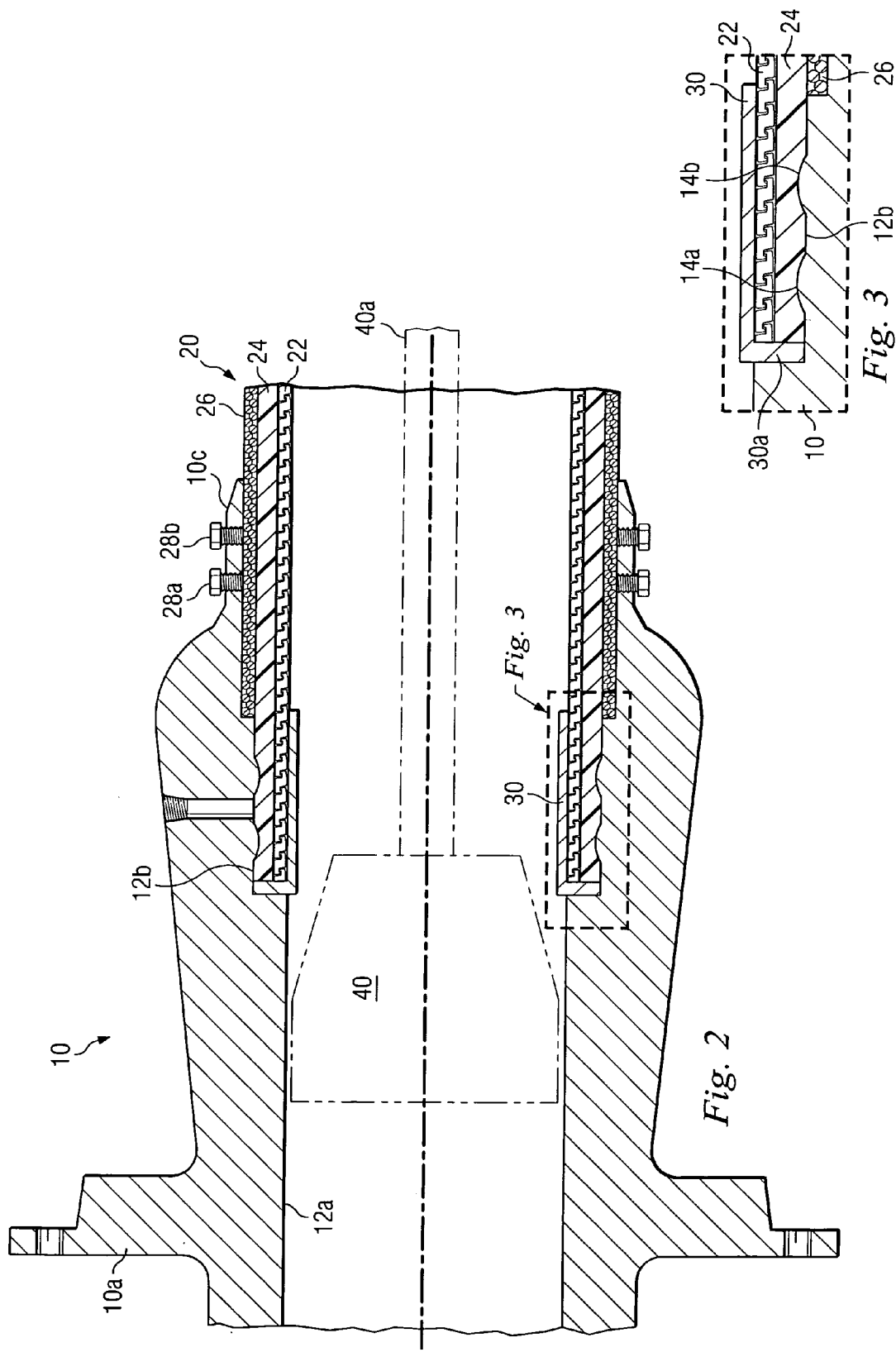

FLEXIBLE PIPE/END FITTING ASSEMBLY AND METHOD

CROSS-REFERENCE TO RELATED APPLICATION

This application claims priority to provisional application U.S. Ser. No. 60/457,653, filed Mar. 26, 2003.

BACKGROUND

The present invention relates to a flexible pipe and end fitting assembly and, more particularly, to such an assembly which is relatively simple in construction, low in cost, and easy to assemble.

When crude oil, gas, or other similar fluids are transported through pipes and/or risers in subsea environments, several challenges are presented with respect to designing the pipes and risers for transporting the fluids, and providing proper end fittings for same. For example, the pipes and risers must provide a fluid barrier while being resistant to collapse and penetration, yet must be flexible and connectable to other equipment. Also, an effective seal must be established between the end bore portion of the pipe and the end fitting. To this end, many designs of this type require sophisticated seal rings between the pipe and its end fitting, which designs are expensive and require extensive assembly labor.

The present invention is directed to a flexible pipe/end fitting assembly that meets all of these criteria, including an effective seal between the pipe and its end fitting, yet is relatively simple in construction, easy to assemble, and inexpensive.

BRIEF DESCRIPTION OF THE DRAWING

FIG. 2 is a view similar to that of FIG. 1, but depicting the end fitting of FIG. 1 connected to a flexible pipe.

FIG. 3 is an enlarged, partial view of a detail of FIG. 2.

DETAILED DESCRIPTION

Figure 1:
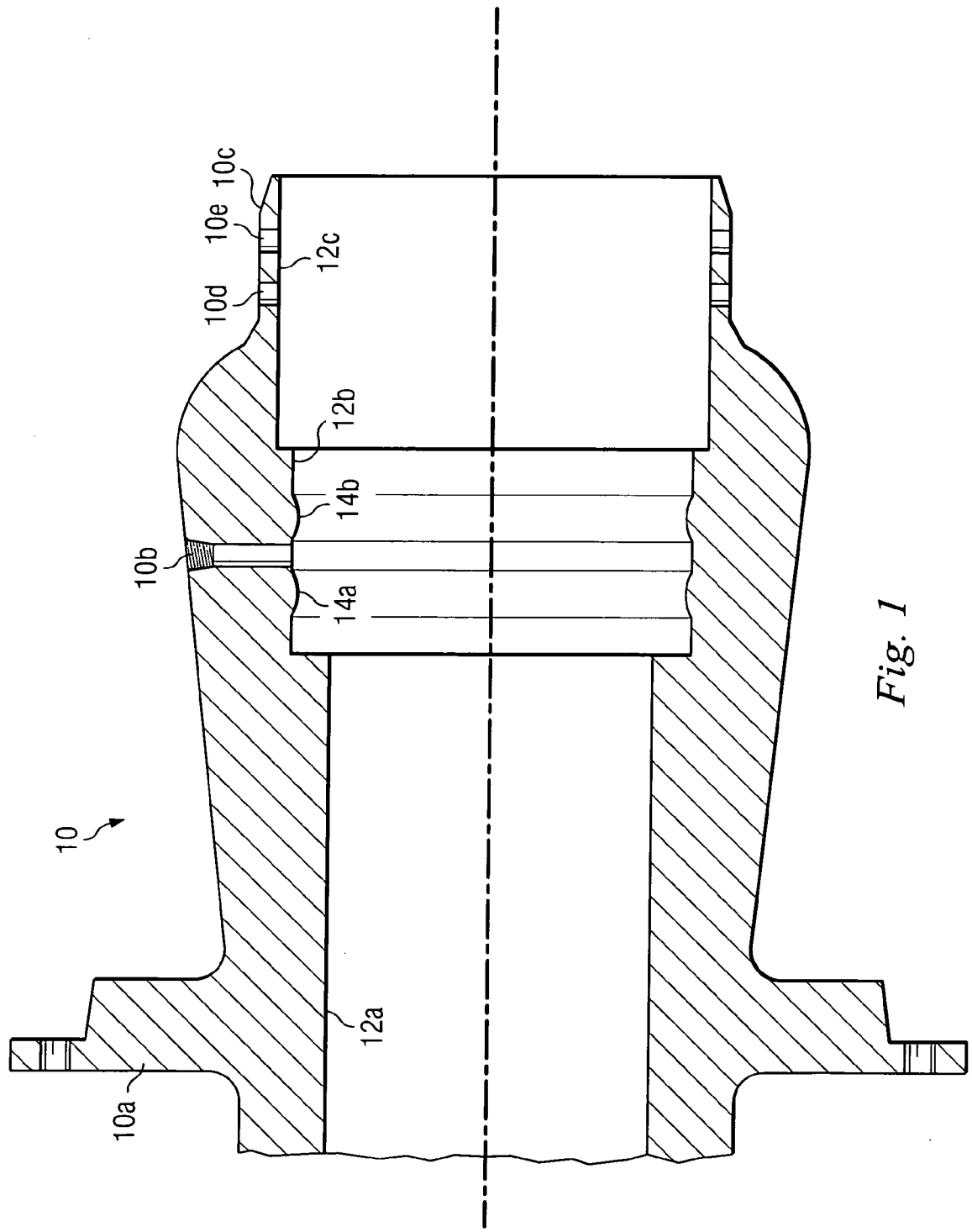
FIG. 1 is a partial longitudinal sectional view of an end fitting assembly according to an embodiment of the present invention.

Referring to FIG. 1 of the drawing, an end fitting according to an embodiment of the invention is shown, in general, by the reference numeral 10. The end fitting 10 is in the form of a generally tubular-shaped housing that includes an annular flange 10a extending radially outwardly therefrom to permit the end fitting to be connected to other equipment.

A radially extending test port 10b extends through the wall of the end fitting 10, and the end fitting has a reduced outer diameter portion 10c through which two radially extending, externally threaded, bores 10d and 10e extend that are adapted to receive externally threaded bolts (not shown in FIG. 1) for reasons to be described.

The end fitting 10 has a continuous bore extending therethrough which is stepped to form an end portion 12a, a scalloped or undulating intermediate portion 12b, and an opposite end portion 12c. The inner diameter of the intermediate bore portion 12b is greater than the inner diameter of the end bore portion 12a and less than the inner diameter of the end bore portion 12c.

Two axially spaced, annular, raised, projections 14a and 14b, each having a curved cross section, extend around the inner circumference of the wall defining the intermediate bore portion 12b. The projections 14a and 14b can be formed in any conventional manner such as by scalloping or undulating the latter wall, molding the projections integrally with the wall, etc.

FIG. 2 depicts a flexible pipe 20 connected to the end fitting 10. The pipe 20 is formed by an inner tubular layer 22, preferably in the form of an interlocking metallic carcass fabricated from a range of corrosion resistant stainless steel alloys depending on the fluid to be conveyed. A tubular barrier layer 24 extends around the layer 22 with the inner surface of the former being in intimate contact with the outer surface of the latter. Although the material forming the layer 24 can vary, an example would be a plastic material, such as a polymer, so as to be chemically resistant to the fluid being conveyed. Examples of the latter material are high-density polyethylene (HDPE), PA11 nylon, and polyvinylidene fluoride (PVDF).

An armor, or strength, layer 26 is wrapped around the layer 24 with the inner surface of the former being in intimate contact with the outer surface of the latter. The layer 26 is designed to provide resistance to internal and external pressure in the hoop direction, and can take several forms. For example, the layer 26 can be formed by circumferentially winding one or more profiled wires, preferably formed of carbon steel, around the layer 24, with adjacent windings being interlocked, to form an armor layer.

The length of the layer 26 is less than that of the layers 22 and 24 and the layer 26 is positioned so that its end abuts the shoulder between the intermediate bore portion 12b and the end bore portion 12c, and so that its corresponding end portion engages the end bore portion 12c. Two bolts 28a and 28b are threaded into the bores 10d and 10e with their respective ends engaging the layer 26 to secure the pipe 20 to the end fitting 10.

As better shown in FIG. 3, a retaining ring 30 is disposed in the end portion of the pipe 10, and more particularly, along that portion of the inner layer 22 extending along the intermediate bore portion 12b. The ring 30 has an annular flange 30a extending radially outwardly from one end thereof that engages the shoulder at the junction between the end bore portion 12a and the intermediate bore portion 12b. Thus, the respective end portions of the pipe layers 22 and 24 extend between the inner surface of the ring 30 and the wall of the end fitting 10 defining the intermediate bore portion 12b, with the respective ends of the layers abutting the flange 30a. As a result, the projections 14a and 14b sealingly engage the corresponding inner surfaces of the pipe layer 24 with the ring 30 promoting the engagement.

As an example of the method of assembling the end fitting 10 to the pipe 20, the pipe 20 is inserted into the end fitting 10 with the layers 22, 24, and 26 and the ring 30 in the positions shown in FIG. 2 and discussed above. The bolts 28a and 28b are then screwed into the bores 10d and 10e until they engage the layer 26.

A dolly 40 (FIG. 2) is placed in the bore 10 in a spaced relation to the ring 30 and the corresponding end of the pipe 10. The dolly 40 has a tapered cross section and a maximum outer diameter slightly larger than the inner diameter of the pipe ring 20. A rod 40a is connected to the dolly and is driven by a prime mover (not shown) that pulls the rod and the dolly in a direction from right-to-left as viewed in FIG. 2. The dolly 40 thus engages the ring 30 and forces it radially outwardly with sufficient force to increase the inner diameter of the ring 30 to a value that is substantially equal to that of the outer diameter of the dolly 40. Thus, a significant compressive force is established against the pipe layers 22 and 24 to properly position the pipe 20 in the end fitting 10 and to force the projections 14a and 14b into a relatively strong sealing engagement with the layer 24. The pipe 20 is then permanently secured to the end fitting 10 in any conventional manner such as by bolting a jacket, or the like (not shown) over the end fitting and/or injecting epoxy over the layers 22, 24, and 26.

With the projections 14a and 14b providing a significant seal between the pipe 20 and the end fitting 10, the flexible pipe/end fitting assembly of the above embodiment meets all of the criteria required for a flexible pipe as described above, yet is relatively simple in construction, is relatively easy to assemble, is relatively inexpensive, and is relatively easy to test.

VARIATIONS (1) The number of sealing projections 14a and 14b can vary from the number described above.

(2) The sealing projections 14a and 14b can be formed by molding them into the intermediate wall portion 12b of the end fitting 12.

(3) The sealing projections 14a and 14b can be formed separately from the housing of the end fitting 12 and attached, bonded, or otherwise secured to the intermediate wall portion in any conventional manner.

(4) The cross section, or profile, of the sealing projections 14a and 14b can have a shape other than curved.

(5) The composition of each of the layers 22, 24, and/or 26 can be varied within the scope of the invention.

(6) One or more of the layers 22, 24, and/or 26 can be eliminated, and/or replaced by another layer of a different design.

(7) Two or more of the layers 22, 24, and/or 26 can be provided and/or additional layers of a different design can be added to the layers 22, 24 and/or 26.

(8) The relative dimensions of the projections 14a and 14b, as well as the layers 22, 24, and 26 can be varied.

(9) An outer jacket can be placed over the end fitting 10 and the aforementioned additional layers can be extended into a space between the outer jacket and the end fitting and an epoxy can be injected into the space and around the extended portions of the additional layers.

(10) The scalloped or undulating surfaces defining the intermediate bore portion 12b can be replaced with a straight surface having sealing members or profiles formed thereon or therein.

(11) The spatial references, such as "under", "over", "between", "outer", "inner" and "surrounding" are for the purpose of illustration only and do not limit the specific orientation or location of the layers described above.

(12) Conventional ring seals can be provided in addition to the sealing projections 14a and 14b.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention.

What is claimed is:

1. An end fitting for a flexible pipe, the end fitting comprising:
    a housing having an inner surface defining a bore for receiving an end portion of the pipe, the bore having at least two axially spaced raised portions each having a curved cross section for engaging the corresponding outer surface of the pipe to provide a seal; and
    a radially extending test port formed through the housing and opening at an outer surface of the housing and at the inner surface of the housing at a location between the raised portions.

2. The end fitting of claim 1 wherein each raised portion is formed integrally with the housing.

3. The end fitting of claim 1 or 2 wherein each raised portion is in the form of an annular ring.

4. The end fitting of claim 1 wherein each raised portion is formed by providing scallops in the housing surface.

5. The end fitting of claim 1 wherein each raised portion is formed by providing undulations in the housing surface.

6. The end fitting of claim 1 wherein the bore is stepped to define at least two bore portions having different diameters, each raised portion being formed in the bore portion having the lesser diameter.

7. The end fitting of claim 6 wherein the pipe has multiple layers, wherein the end portions of all of the layers extends in the bore portion with the greater diameter; and wherein the end portion of less than all the layers extend in the bore portion with the lesser diameter.

8. The end fitting of claim 1 further comprising a support ring extending within an end portion of the pipe so that the latter end portion of the pipe extends between the raised portions and the support ring.

9. The end fitting of claim 8 wherein:
    the bore is stepped to define first, second, and third bore portions of progressively decreasing diameters, the third bore portion having the smallest diameter and the first bore portion having the largest diameter, the second bore portion being intermediate the first and third bore portions, and the raised portions being formed in the second bore portion;
    the support ring has an annular flange formed thereon that engages a shoulder defined between the second and third bore portions.

10. The end fitting of claim 9 wherein the flange extends radially outwardly from the support ring.

11. The end fitting of claim 9 wherein the flange extends between the shoulder and the corresponding end of the pipe.

12. An end fitting for a flexible pipe, the end fitting comprising:
    a housing having an inner surface defining a bore for receiving an end portion of the pipe, the bore having at least two axially spaced raised portions each having a curved cross section for engaging the corresponding outer surface of the pipe to provide a seal; and
    a radially extending, internally threaded, opening formed through the housing and extending to the bore, and a bolt threadedly engaging the opening and adapted to engage the pipe.

13. A pipe assembly comprising an end fitting comprising:
    a housing having an inner surface defining a bore, the bore having at least two axially spaced raised portions each having a curved cross section; and
    a flexible pipe having an end portion extending in the bore, the raised portions engaging the corresponding outer surface of the pipe to provide a seal;
    wherein the bore is stepped to define at least two bore portions having different diameters, the raised portions being formed in the bore portion having the lesser diameter;
    wherein the pipe has multiple layers, the end portions of all of the layers extend in the bore portion with the greater diameter, and the end portions of less than all the layers extend in the bore portion with the lesser diameter.

14. The pipe assembly of claim 13 wherein each raised portion is formed integrally with the housing.

15. The pipe assembly of claim 13 or 14 wherein each raised portion is in the form of an annular ring.

16. The pipe assembly of claim 13 wherein each raised portion is formed by providing scallops in the housing surface.

17. The pipe assembly of claim 13 wherein each raised portion is formed by providing undulations in the housing surface.

18. The pipe assembly of claim 13 further comprising a support ring extending within an end portion of the pipe so that the latter end portion of the pipe extends between the raised portions and the support ring.

19. The pipe assembly of claim 18 wherein:
the at least two bore portions comprises a first bore portion having a first diameter, a second bore portion adjacent the first bore portion and having a second diameter that is less than the first diameter, and a third bore adjacent the second bore portion having a third diameter that is less than the second diameter, the raised portions being formed in the second bore portion;
the ring has an annular flange formed thereon that engages a shoulder defined between the second and third bore portions.

20. The pipe assembly of claim 19 wherein the flange extends radially outwardly from the support ring.

21. The pipe assembly of claim 19 wherein the flange extends between the shoulder and the corresponding end of the pipe.

22. A pipe assembly comprising:
an end fitting comprising a housing having an inner surface defining a bore, the bore having at least two axially spaced raised portions each having a curved cross section;
a flexible pipe having an end portion extending in the bore, the raised portions engaging the corresponding outer surface of the pipe to provide a seal; and
a radially extending test port formed through the housing and opening at an outer surface of the housing and at the inner surface of the housing at a location between the raised portions.

23. A pipe assembly comprising:
an end fitting comprising a housing having an inner surface defining a bore, the bore having at least two axially spaced raised portions each having a curved cross section;
a flexible pipe having an end portion extending in the bore, the raised portions engaging the corresponding outer surface of the pipe to provide a seal; and
a radially extending, internally threaded, opening formed through the housing and extending to the bore, and a bolt threadedly engaging the opening and adapted to engage the pipe.

24. A method of assembling a pipe assembly comprising:
forming a bore in an end fitting, forming at least two axially spaced raised portions each having a curved cross section on the inner surface of the housing defining the bore;
inserting an end portion of a flexible pipe in the bore with the raised portions engaging the corresponding outer surface of the pipe to provide a seal; and
forming a radially extending, internally threaded, opening through the housing and extending to the bore, and threadedly engaging the opening with a bolt and extending the bolt through the opening so that it engages the pipe.

25. The method of claim 24 wherein each raised portion is formed integrally with the housing.

26. The method of claim 24 or 25 wherein each raised portion is in the form of an annular ring.

27. The method of claim 24 wherein the step of forming each raised portion comprises providing scallops in the housing surface.

28. The method of claim 24 wherein the step of forming each raised portion comprises providing undulations in the housing surface.

29. The method of claim 24 further comprising stepping the bore to define at least two bore portions having different diameters, each raised portion being formed in the bore portion having the lesser diameter.

30. The method of claim 24 further comprising inserting a support ring within an end portion of the pipe so that the latter end portion of the pipe extends between the raised portions and the support ring.

31. The method of claim 30 further comprising:
stepping the bore to define first, second, and third bore portions of progressively decreasing diameters, the raised portions being formed in the second bore portion;
providing an annular flange on the ring, the step of inserting comprising disposing the flange in engagement with a shoulder defined between the second and third bore portions.

32. The method of claim 31 wherein the flange extends radially outwardly from the support ring.

33. The method of claim 31 wherein the flange extends between the shoulder and the corresponding end of the pipe.

34. The method of claim 24, further comprising applying a radially outwardly directed force to the inner surface of the pipe end portion to compress the pipe end portion against the raised portions.

35. A method of assembling a pipe assembly comprising:
forming a bore in an end fitting, forming at least two axially spaced raised portions each having a curved cross section on the inner surface of the housing defining the bore;
inserting an end portion of a flexible pipe in the bore with the raised portions engaging the corresponding outer surface of the pipe to provide a seal; and
forming a radially extending test port through the housing, the test port opening at an outer surface of the housing and at the inner surface of the housing at a location between the raised portions.

36. A method of assembling a pipe assembly comprising:
forming a bore in an end fitting, forming at least two axially spaced raised portions each having a curved cross section on the inner surface of the housing defining the bore;
inserting an end portion of a flexible pipe in the bore with the raised portions engaging the corresponding outer surface of the pipe to provide a seal;
stepping the bore to define at least two bore portions having different diameters, each raised portion being formed in the bore portion having the lesser diameter;
providing the pipe with multiple layers, disposing the end portions of all of the layers in the bore portion with the greater diameter; and disposing the end portions of less than all the layers in the bore portion with the lesser diameter.

* * * * *